Aug. 2, 1966 G. H. W. DOBBERTIN 3,263,715
SAW BARS FOR PORTABLE POWER DRIVEN CHAIN SAWS
Filed Jan. 23, 1964
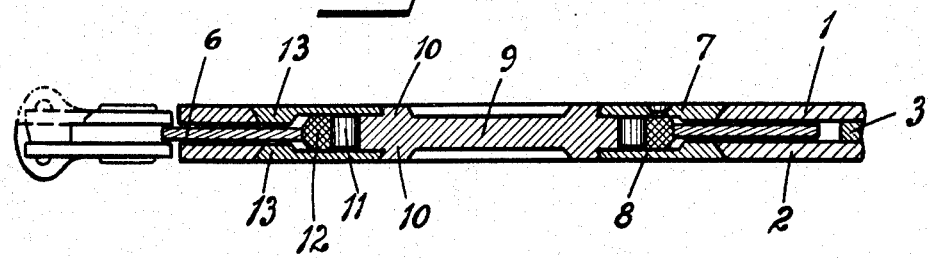
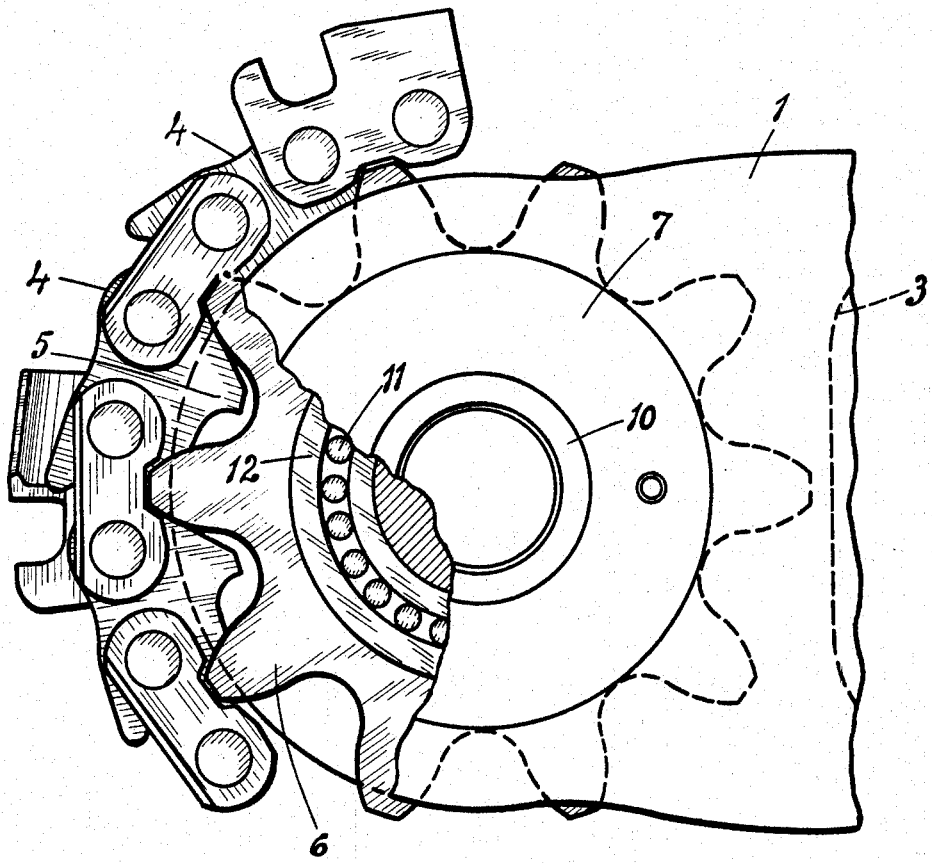
INVENTOR
GUNTHER HEINRICH WILHELM DOBBERTIN
BY *Linton and Linton*
ATTORNEYS

United States Patent Office 3,263,715
Patented August 2, 1966

3,263,715
SAW BARS FOR PORTABLE POWER DRIVEN CHAIN SAWS
Gunther Heinrich Wilhelm Dobbertin, 28, Ovra Olskroksgatan, Goteborg, Sweden
Filed Jan. 23, 1964, Ser. No. 339,705
3 Claims. (Cl. 143—32)

The present invention relates to saw bars for portable power driven chain saws and of the kind having a sprocket wheel at its free end around which the saw chain extends, the thickness of said wheel substantially corresponding to the width of the guide groove for the saw chain extending along the edge of the saw bar, said wheel being rotatably journalled by means of roller elements on a member which forms the inner race for the roller elements and is secured between two side members.

In previously known saw bars of this type the dimension of the roller elements which may be used is limited by the space available in axial direction of the sprocket wheel, and said space does not substantially exceed the thickness of the wheel.

The invention has for its object to provide a saw bar of the kind set forth above wherein the space for the roller elements is enlarged without any appreciable increase in the thickness of the saw bar, so that it will be possible to use considerably larger roller elements than what has been hitherto possible.

The invention is mainly characterised in that said side members, the outer surfaces of which are in substantially the same plane as the outer surfaces of the saw bar, surround an annular space which encloses said roller elements and the extension of which axially of said sprocket wheel is larger than the width of said guide groove.

According to one embodiment of the invention said side members are set in openings provided opposite one another in the sides of the saw bar, said side members having bevelled circumferential edges and the edges confining said side openings being bevelled in a corresponding manner.

The member forming the inner race for the roller elements may be secured in openings provided opposite one another in the side members, edge portions of said member being deformed so as to engage those edge portions of the side members which confine the last-mentioned openings.

According to the invention, the sprocket wheel is preferably carried on the roller elements by the intermediary of an annulus sweated on to the sprocket wheel, the axial extension of said annulus being substantially equal to the axial extension of said annular space.

One embodiment of the invention will be described herebelow with reference to the accompanying drawing, wherein:

FIG. 1 is a partly broken side view of the front end portion of a saw bar made in accordance with the invention, part of a saw chain being shown in engagement with the sprocket wheel of the saw bar, and, FIG. 2 is a longitudinal cross section through the portion of the saw bar shown in FIG. 1.

In the embodiment shown the saw bar (of which only the free end portion is shown in the drawing) in known manner comprises two side plates 1 and 2 provided on opposite sides of a plate 3 which, as shown in the drawing, terminates a distance from the free end of the saw bar and which is of smaller width than the side plates 1 and 2, so that between the side plates there is formed, at the longitudinal edges of the saw bar, a guide groove for a saw chain of the kind shown in the drawing. The center links 4 of the saw chain are provided with drive teeth 5 which project into said groove and which engage a sprocket wheel provided at that end of the saw bar which is attached to the housing of the power saw, said sprocket wheel being driven by the engine of the saw. At the front end of the saw bar, as shown in the drawing, the drive teeth 5 of the center chain links 4 engage the teeth of a sprocket wheel 6 rotatably journalled between the side plates 1 and 2.

Two annular side members 7 and 8 are set in circular openings provided opposite one another in the side plates 1 and 2, and centrally between said side members there is provided a circular plate 9 which is connected with each of the side members 7 and 8 by means of an annular edge portion 10 projecting into the opening of each of said side members, said edge portion being deformed so as to engage the bevelled edge portion of the side member surrounding said opening. The circumferential surface of the plate 9 forms the inner race for rollers 11, the outer race for which is formed by an annulus 12 which is sweated on to the sprocket wheel 6.

As will appear from FIG. 2, the side members 7 and 8 have such dimensions, that their outer surfaces are in the same planes as the outer surfaces of the side plates 1 and 2, respectively, of the saw bar, while the space between the side members is appreciably larger than the space between the side plates 1 and 2, i.e. larger than the width of the guide groove for the saw chain, and consequently larger than the thickness of the sprocket wheel 6. Adjacent the outer edges of the side members 7 and 8 there are provided annular, thicker portions 13 facing one another, said portions forming between them an annular opening having a width substantially corresponding to the width of the guide groove. Between the side members 7 and 8 there will thus be formed, inside of the portions 13, an annular space for the roller elements (rollers 11) which is limited by the side members and the plate 9 and which has an extension axially of the sprocket wheel which is considerably greater than the width of the guide groove for the saw chain, so that there will be space available for roller elements of appreciably larger dimensions than the thickness of the tooth wheel 6.

As will also appear from FIG. 2, those edge portions of the saw bar side plates 1 and 2 which delimit the openings therein are bevelled, and the outer edge portions of the side members 7 and 8 have a corresponding undercut shape. This will cause the side members to support the side plates of the saw bar against oblique stresses occurring during sawing.

The invention is not limited to the embodiment which has been described hereinbefore and shown in the drawing as an example only, said embodiment being capable of modifications with respect to its details without departing from the basic concept of the invention. Thus, the side members 7, 8 may for instance be in the form of whole plates, and the plate 9 which forms the inner race for the roller bearing will then be completely enclosed between the side members and secured thereto by means of nuts.

What I claim is:

1. A saw bar for portable power driven chain saws and of the kind having a sprocket wheel at its free end around which a saw chain extends, a guide groove for the saw chain extending along the edge of the saw bar and said sprocket wheel having a thickness substantially corresponding to the width of the guide groove, said saw having spaced apart side plates at its free end provided with openings opposite one another, side members each being set in one of said side plate openings, said side members each having bevelled circumferential edges, said side plate openings each having edges defining said openings being bevelled in a manner corresponding to said side member bevelled circumferential edges which engage therewith, a member secured between said side members and providing an inner race, roller elements positioned on said inner race rotatably supporting the sprocket wheel, and said side members, the outer surfaces of which are in substantially the same plane as the outer surfaces of said side plates, surround an annular space which encloses said roller elements and the extension of which axially of the sprocket wheel, is larger than the width of the saw bar guide groove.

2. A saw bar for portable power driven chain saws and of the kind having a sprocket wheel at its free end around which a saw chain extends, a guide groove for the saw chain extending along the edge of the saw bar and said sprocket wheel having a thickness substantially corresponding to the width of the guide groove, said saw bar having spaced apart side plates at its free end provided with openings opposite one another, side members each being set in one of said side plate openings, said side members having openings opposite one another, defined by edges of said side members, a member secured in said side member openings and providing an inner race, said member having edge portions of a configuration to engage said edge portions of said side members which define said side member openings, roller elements positioned on said inner race rotatably supporting the sprocket wheel, and said side members, the outer surfaces of which are in substantially the same plane as the outer surfaces of said side plates, surround an annular space which encloses said roller elements and the extension of which, axially of the sprocket wheel, is larger than the width of the saw bar guide groove.

3. A saw bar for portable power driven chain saws and of the kind having a sprocket wheel at its free end around which a saw chain extends, a guide groove for the saw chain extending along the edge of the saw bar and said sprocket wheel having a thickness substantially corresponding to the width of the guide groove, said saw bar having spaced apart side plates at its free end provided with openings opposite one another, side members each being set in one of said side plate openings, said side members having openings opposite one another defined by edges of said side members, said side member edges defining said openings therein being bevelled, a member secured in said side member openings and providing an inner race, said member having edge portions of a configuration to engage said edge portions of said side members which define said side member openings, roller elements positioned on said inner race rotatably supporting the sprocket wheel, and said side members, the outer surfaces of which are in substantially the same plane as the outer surfaces of said side plates, surround an annular space which encloses said roller elements and the extension of which, axially of the sprocket wheel, is larger than the width of the saw bar guide groove.

References Cited by the Examiner
UNITED STATES PATENTS

| | | | |
|---|---|---|---|
| 1,642,856 | 9/1927 | Holmes | 143—32.4 |
| 2,693,206 | 11/1954 | Anttonen | 143—32 |
| 3,124,177 | 3/1964 | Ekrud | 143—32.10 |
| 3,198,223 | 8/1965 | Bowen | 143—32 |

DONALD R. SCHRAN, *Primary Examiner.*